US 8,810,811 B2

(12) United States Patent
Weber (10) Patent No.: US 8,810,811 B2
(45) Date of Patent: Aug. 19, 2014

(54) METHOD AND APPARATUS FOR PRODUCING A PRINTED PRODUCT IN ACCORDANCE WITH A PRINT JOB

(75) Inventor: Mathias-Henry Weber, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 498 days.

(21) Appl. No.: 12/547,527

(22) Filed: Aug. 26, 2009

(65) Prior Publication Data

US 2010/0053657 A1    Mar. 4, 2010

(30) Foreign Application Priority Data

Aug. 26, 2008 (DE) .................. 10 2008 039 661

(51) Int. Cl.
*G06F 3/12* (2006.01)
*G06K 15/00* (2006.01)
*H04N 1/60* (2006.01)

(52) U.S. Cl.
USPC ....... 358/1.13; 358/1.14; 358/1.15; 358/1.18; 358/1.9

(58) Field of Classification Search
CPC .................... B41F 33/0009; G06F 3/1296
See application file for complete search history.

(56) References Cited

U.S. PATENT DOCUMENTS

| | | | |
|---|---|---|---|
| 5,467,434 A * | 11/1995 | Hower et al. ................. | 358/1.15 |
| 6,650,431 B1 | 11/2003 | Roberts et al. | |
| 6,934,047 B2 | 8/2005 | Housel | |
| 2002/0105672 A1 * | 8/2002 | Housel ......................... | 358/1.15 |
| 2002/0186384 A1 | 12/2002 | Winston et al. | |
| 2004/0070788 A1 * | 4/2004 | Barry et al. .................. | 358/1.15 |
| 2004/0184105 A1 | 9/2004 | Ferlitsch | |
| 2005/0237571 A1 | 10/2005 | Motamed et al. | |
| 2006/0290979 A1 | 12/2006 | Sumio | |
| 2007/0229881 A1 | 10/2007 | Matsubara et al. | |
| 2008/0079963 A1 | 4/2008 | Matsubara | |

FOREIGN PATENT DOCUMENTS

| | | |
|---|---|---|
| EP | 0729090 A1 | 8/1996 |
| EP | 1 229 728 A2 | 8/2002 |

OTHER PUBLICATIONS

European Search Report dated Oct. 20, 2009.
German Patent and Trademark Office Search Report, dated May 11, 2009.

* cited by examiner

*Primary Examiner* — Marivelisse Santiago Cordero
*Assistant Examiner* — Moustapha Diaby
(74) *Attorney, Agent, or Firm* — Laurence A. Greenberg; Werner H. Stemer; Ralph E. Locher (57) ABSTRACT

Until now, manual sorting of a print job and corresponding media on which printing is to take place has been necessary in order to assign them to printing presses provided for that purpose, if required properties of the printed product were to be achieved with different machines and components. That is simplified by a method for producing a printed product in accordance with a print job in which a rule set having at least one rule is provided, by which reference objects are assigned to lists based on input variables and output variables. The printed product is produced on corresponding printing systems in accordance with the output variables. An apparatus for carrying out the method includes a job splitter for splitting up the lists in accordance with the rule sets, and an assignment module for assigning the lists to corresponding printing systems.

10 Claims, 5 Drawing Sheets

| R1 | Colored |
| R2 | Paper weight is 80g |
| R3 | Paper weight is 120g |
| R4 | Further processing in stitcher |

METHOD AND APPARATUS FOR PRODUCING A PRINTED PRODUCT IN ACCORDANCE WITH A PRINT JOB

CROSS-REFERENCE TO RELATED APPLICATION

This application claims the priority, under 35 U.S.C. §119, of German Patent Application DE 10 2008 039 661.3, filed Aug. 26, 2008; the prior application is herewith incorporated by reference in its entirety.

BACKGROUND OF THE INVENTION

Field of the Invention

The present invention relates to a method and an apparatus for dividing up a print job in accordance with properties of the printed products and more specifically to a method and an apparatus for producing a printed product in accordance with a print job, in which the print job includes at least one reference object, which itself can include at least one base object. At least one job file, which is to be provided for that purpose, includes input variables that are assigned to the base objects and/or the reference objects and describe desired properties of the reference objects.

An extremely wide range of different output devices are available nowadays to produce a printed product. Such devices are printing presses which are able to image different formats of printing materials with different grammages in an extremely wide range of different ways. For instance, the output devices can be digital printing presses or conventional offset printing presses. In the digital printing presses or in the offset printing presses, it is further possible to distinguish between machines which produce pure black/white prints or which produce colored prints. Different printing presses can be provided in order to carry out the printing process, depending on the format and grammage of the desired printed product.

All of the desired properties of the resultant printed product are provided within a file in a print job. In that case, it can, for example, be a job file which explicitly contains only the desired properties of the printed product or else, in addition thereto, PDFs, which contain the content of the individual pages or sheets of the print job. That job file can then be stored, for example in the form of a job data format (JDF). Frequently, that information is also treated as job ticket data, which contains all of the parameters which are needed to carry out the print job. In that file, a list relating to a storage location of the image data, for example in the form of PDFs, can also be stored.

That data can involve, for example, paper size but also finishing information for further post-press treatment of the printed product.

The print job can be transferred to the printing press, for example through a network or through a computer connected to the printing press. Within that network, different printing presses can also be available as output devices.

In that case, a print job can describe an extremely wide range of different types of printed products. It can involve a brochure, a catalog, a newspaper, a book or the like. The print job can include an extremely wide range of different sheets from printing originals, depending on the desired printed product. Those printing originals can be provided for the purpose of being printed in color or black/white or with special inks. Provision can further be made for printing material with a higher grammage to be provided for individual sheets or for coated or uncoated paper to be provided for some pages. In addition, specific pages which are screened differently from the remaining pages can be provided. It is also possible for sheets of different formats to be provided.

Printing all of those printed sheets, which are intended to correspond to different requirements, on a single printing press, is to some extent time-consuming and also expensive. If, for example, only a few colored pages are provided, it would then be necessary for the entire print job to be carried out on a color printing press. The latter would then be blocked for other print jobs during the entire print job. If only a specific part of the print job has to be printed with a large-format output device, then the latter is no longer available for other jobs during the entire print job.

European Patent Application EP 1 229 728 A2, corresponding to U.S. Pat. No. 6,934,047, discloses the practice of splitting up a print job in accordance with pages containing color and black/white. That is done through the use of an RIP, which then subsequently processes the print jobs for the black/white printing press and for the color printing press. The colored pages which are then produced are then sorted into their corresponding places in the black/white printing press. In order to carry out that method, it is necessary for the unprocessed data to be available. In addition, other required properties of the printed product cannot be satisfied by that apparatus and the method described. For that purpose, manual sorting of the print job and the corresponding media on which printing is to be carried out is needed in order to assign the job and corresponding media to the printing presses provided for that purpose.

SUMMARY OF THE INVENTION

It is accordingly an object of the invention to provide a method and an apparatus for producing a printed product in accordance with a print job, which overcome the hereinafore-mentioned disadvantages of the heretofore-known devices and methods of this general type.

With the foregoing and other objects in view there is provided, in accordance with the invention, a method for producing a printed product in accordance with a print job. The method comprises providing the print job with at least one reference object, which itself can include at least one base object, providing at least one job file including input variables associated with the base objects and/or the reference objects and describing desired properties of the reference objects and base objects, providing a rule set having at least one rule, assigning the reference objects to lists with the at least one rule, assessing, for the assigning step, at least one input variable of the reference objects and/or the base objects included by the reference objects on the basis of a true/false relationship, with the at least one rule, assigning each list finally produced by the rule set a set of output variables, and producing the printed product in accordance with the output variables.

Therefore, according to the invention, a rule set including at least one rule is provided. On the basis of this rule, the reference objects and/or the base objects that they include are assessed, specifically in such a way that it is possible to produce a true/false relationship between the rule and an input variable of the reference object and/or the base object. The individual reference objects are correspondingly assigned to lists in accordance with the selection through the use of this rule or the entire rule set. Sets of output variables are assigned to these final lists of the rule set. The printed product is then produced in accordance with these output variables.

The reference objects can, for example, be a sheet which includes a number of pages as base objects. Alternatively, it is also possible for a reference object to be an individual page which includes different parts of a document.

The rule is a selection rule. It makes a selection as to whether the input variable of reference objects and/or base objects of these reference objects satisfies the condition of the rule or not.

The input variables are desired properties of the base objects or reference objects. Desired properties can, for example, be: a specific format of a page or of an entire printed sheet, a desired grammage of the printed sheet or of the page which the latter includes or a colored image on a printed page, with the remainder of the printed sheet which includes this page being printed black/white.

For example, the rule can state: a printed page includes colored elements. The printed page is then a base object which is included by a sheet as a reference object. Through the use of the rule set or the rule, then firstly a list having reference objects, sheets in this case, is produced, which corresponds to the statement that a base object, which means a page, includes colored elements, and a second list, to which the reference objects, i.e. sheets, are assigned, includes the base objects, which means pages, which have no exclusively colored elements. Finally, in each case a set of output variables is assigned to these lists. The output variables provided in this case can be printing presses, for example, which firstly are able to print in color and secondly to print black/white, for example these can be digital printing presses having color printing units and a second digital printing press on its own having a black/white printing unit. The printing press having the color printing units is then assigned as an output variable to the list which includes reference objects having pages that have colored elements, with the black/white printing press then being assigned to the second list. The individual reference objects, which means sheets, are then imaged on the appropriate printing presses and then post-processed suitably, sorted or else stitched and/or folded. It is also possible for an input variable to, for example, be a format or a desired grammage of a page or of a sheet. Using appropriate rules which assess this desired property of the page or of the sheet, which means of a base object or of a reference object, in each case corresponding lists with associated sheets can be produced. These lists are then assigned output variables, for example specific printing materials, such as printing materials having an appropriate grammage. In addition, as further output variables, these lists can also be assigned specific printing presses. The printed sheets which are to be produced on printing material having a higher grammage are then produced appropriately.

In accordance with another mode of the invention, provision is further advantageously made for the rule set to include at least two rules, which are processed one after the other, each following rules assessing the input variables of the reference objects which have been assigned to a specific list by the preceding rules and, in accordance with the assessment, assigning the reference objects to further lists in a branched manner, with the last lists branched in accordance with the rule set in each case being assigned sets of output variables, according to which the printed product is produced.

By processing rules of a rule set, it is beneficially possible to produce lists of reference objects which in each case correspond to a quite specific set of input variables. These can, for example, be sheets which include individual pages that have colored elements, with the intention being to print the sheets on printing materials of a specific grammage. A list which is branched for this purpose could, for example, include sheets, with the intention being for the printing materials further to be varnished in a specific way before the actual printing. A second branched list produced in parallel therewith would then include non-varnished printing materials but with the remaining properties being identical with the first list. In this advantageous way, it is possible to produce lists which in each case include reference objects, which means sheets or pages, that place particular requirements on the printing process. These particular requirements are then assigned to the lists in the form of the output variables.

In accordance with a further mode of the invention, in a particularly advantageous development, provision is made for it to be possible for the rules to be produced on the basis of input variables. In this way, new rules can be produced again and again when new input variables, which means new desired properties of the reference objects or base objects, appear for a print job. It is therefore not necessary for all of the possible rules to have to be stored in a corresponding system. In particular, it is possible to form rule sets automatically which, for each property of the printed product or parts of the printed product, in accordance with the information stored in a data file, in each case contain at least one rule, irrespective of whether or not this property was previously already known to the processing system. In this case, a rule can in particular also branch to more than two parallel lists.

In accordance with an added mode of the invention, in a further advantageous development, provision is made for a selection of rules to be made available, from which it is possible to build up a rule set which assigns the reference objects to lists having desired sets of output variables. In this way, a rule set which is matched to the conditions, for example in a print room, can be produced individually by a printer. The possible rules provided in this case are rules already stored in the system and also rules which have just been created for the first time. These created rules can advantageously likewise be stored in the system, like those originally already present.

In accordance with an additional mode of the invention, provision is beneficially made for the lists of the associated reference objects to be stored in the job file itself. This can be provided, for example, in the form of a job data format JDF. This can be processed in a particularly straightforward way by appropriate data processing systems.

With the objects of the invention in view, there is also provided an apparatus for producing a printed product in accordance with a print job for implementing the method according to the invention. The apparatus comprises a job splitter for splitting at least one list of reference objects in accordance with a rule set into at least two further branched lists, the rule set including at least one rule assessing base objects included by the reference objects and/or reference objects in accordance with a true/false relationship and assigning the associated reference objects to appropriate lists, and the true/false relationships being applied to input variables of the base objects or the reference objects, and the input variables describing the desired properties of the base objects and reference objects.

Therefore, in terms of the apparatus, in order to implement the method, a job splitter is provided, which splits up a list of reference objects in accordance with a rule set. In this way, at least two further lists branched therefrom are produced. As already described, this rule set can include a number of rules which then assign the corresponding reference objects to specific lists as a function of properties, which means input variables of the base objects and reference objects.

In accordance with a concomitant feature of the invention, advantageously, provision is further made for there to be an assignment module, which assigns output variables to the lists. These output variables correspond to possible output devices or desired properties of the content of the printed product. They are assigned to the reference objects of a list on the basis of the input variables, which means the desired properties of base objects of the reference objects or the properties of the reference objects themselves. Through this assignment module, an assignment of the reference objects, which means the sheets or the pages, to the various output devices, printing presses or further processing devices is therefore carried out, just as to the different possible printing materials.

Other features which are considered as characteristic for the invention are set forth in the appended claims.

Although the invention is illustrated and described herein as embodied in a method and an apparatus for producing a printed product in accordance with a print job, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
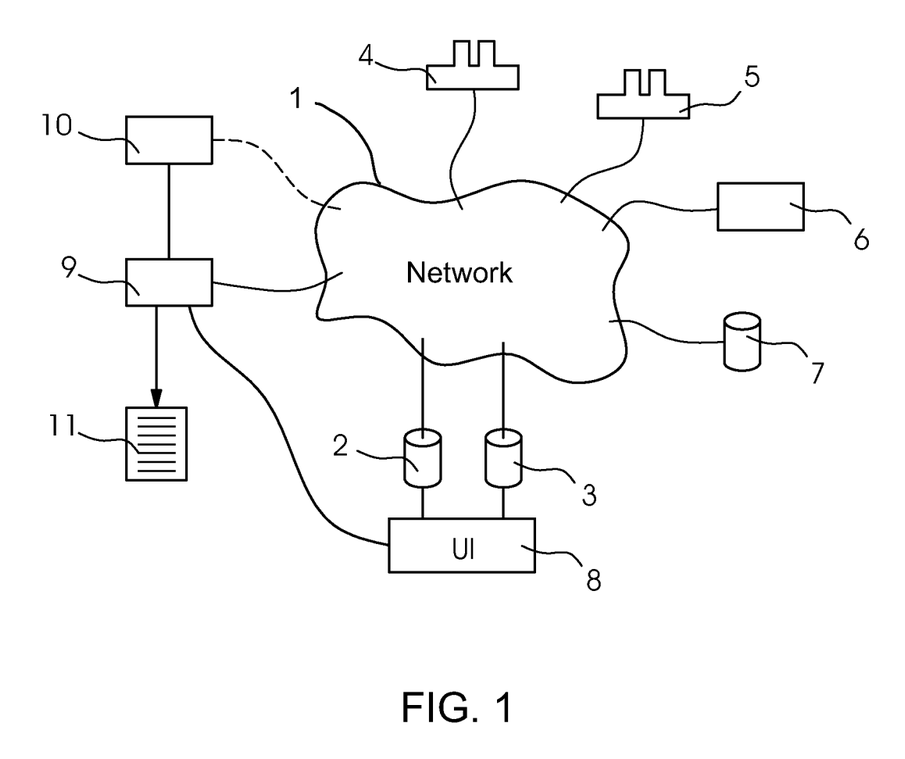
FIG. 1 is a schematic and block diagram showing a basic structure relating to creating a rule set.

Referring now in detail to the figures of the drawings, which illustrate one example of the method and apparatus according to the invention, but to which the invention is not restricted and from which even further inventive features emerge, and first, particularly, to FIG. 1 thereof, there is seen a system through the use of which rule sets 11 can be created for the subsequent organization of a print job.

Various printing presses 4, 5, further processing machines 6, databases 2, 3, 7 that can be used and possible rule creation devices 9 and/or input variable providing elements 10, are connected to one another through a network 1.

The printing units 4, 5 can, for example, be the total number of all of the printing presses provided in a print room, while the further processing devices 6 can, for example, be a selection of further processing devices 6 which are able to work with printed products produced in the printing presses 4, 5.

A large number of rules, which result from possible output variables of print shop operation, can already be provided through the rule database 2. Such rules R1 to R4 are illustrated by way of example in FIG. 4. These output variables are possible properties of printed products which can be produced by the existing measures during printing operation. These can be properties of the printing presses, of plate exposers, of further processing devices or else of properties of consumables that are made available. The consumables can, for example, be different inks, varnishes or else paper grades.

The rules made available in this way in the rule database 2 can also have bookmarks for consumables, for example, which are only filled during the actual creation of the rule sets 11. These bookmarks can, for example, be properties of the printing paper, such as its grammage. The grammages that can actually be selected can then be replaced during the creation of the rule sets 11 while taking into account the paper grades actually available in the print shop operation. For this purpose, in particular a link from a database 7 for consumables to the network 1 outlined can be provided.

Complete rule sets that repeat frequently and are to be used can already be stored in a rule set database 3, so that fast access for known printed products to the rule sets connected therewith is possible. For this purpose, in particular identification numbers can be provided, which link the stored rule sets in the rule set database 3 with already known printed products. Such an identification number can also be produced through the input variables of the printed product to be produced.

Furthermore, a processing device 8 can be provided, through the use of which rules from the rule database 2, rule sets from the rule set database 3 or else resultant rule sets can be manipulated or created directly by a user, through a user interface (UI), in the rule set creation device 9.

The rule set creation device 9 can provide access through the network 1 to the connected printing presses 4, 5 and further processing machines 6 and to the outlined databases 2, 3 and 7. The properties of the connected machines and devices 4, 5, 6 and also of the consumables provided in the database 7 can be used as output variables, which restrict the possibilities of created rule sets 11 to such an extent that only printed products are produced which—through the use of combining these rules—correspond to output variables associated with the devices and consumables.

An input variable provision element 10 is also connected to the rule set creation device 9. Input variables of the printed product to be produced are provided through the use of the input variable provision element 10. These input variables are determined directly from the properties of the different constituents of the printed product.

The constituents of the printed product to be produced can, for example, be different sheets. A sheet on which a page with colored content is provided has, for example, the property colored as an input variable, while another sheet which has no pages with colored contents has the property non-colored or alternatively black/white. Thus, each sheet to be produced that belongs to a printed product can be assigned a property colored or non-colored. Other properties which can be assigned are, for example:
  finishing material to be used,
  specific layout used for a sheet,
  format of the printing material,
  verso print provided,
  grammage of the sheet used,
  special colors to be used,
  screening process,
  etc.

The result from the total number of input variables of a printed product is a restriction of the possible rule sets 11 which are created in the rule set creation device 9.

The rule set creation device 9 creates rule sets 11 as a function of input variables provided by the input variable providing element 10 and of the possible output variables provided through the network 1. These rule sets split up the predefined print job through the use of a job splitter 102 disposed downstream, as seen in FIG. 2.

In particular, the rule sets 11 can be created in such a way that they can be assigned to the exact combinations of input variables which result from the individual parts of the printed product.

Figure 2:
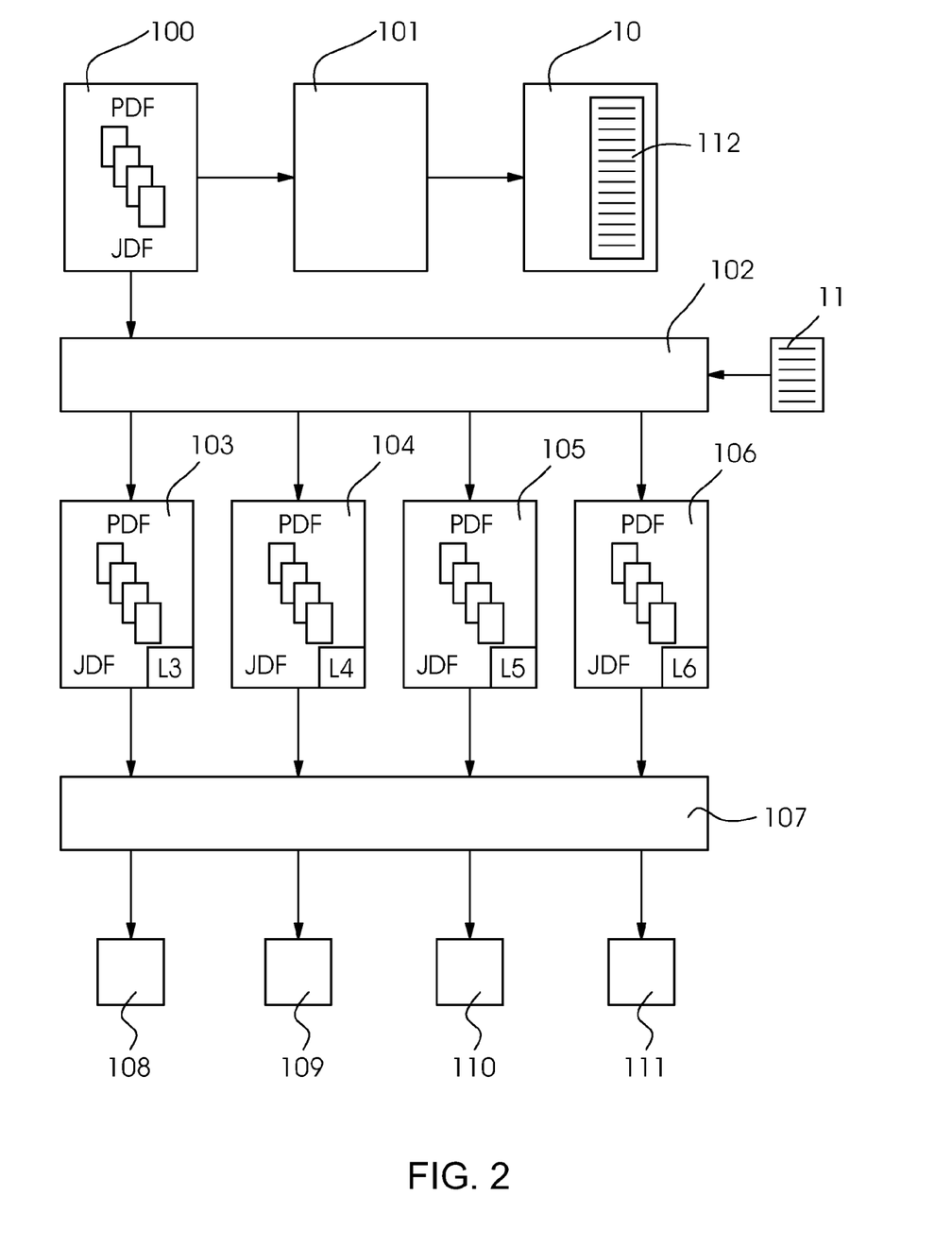
FIG. 2 is a block diagram showing a structure relating to creating input variables with subsequent assignment to printing systems.

FIG. 2 illustrates how, from print job information 100, with the application of an analytical tool 101, input variables 112 are finally provided in the input variable providing element 10.

The print job information 100 is a file which contains all of the information about the nature of the printed product to be produced. This file can, for example, be or at least include a JDF. In addition, one or more PDFs which include the printing originals for the printed product to be produced can also be a constituent of this print job information 100. The print job information 100 is fed to an analytical tool 101, which can be a pre-flight tool.

On the basis of the information stored in the JDF and the data on which the PDFs are based, the analytical tool 101 determines which properties are needed on which pages and on which sheets of the printed product. These properties are generally stored directly in the JDF or can alternatively be brought up from a further database. On the basis of this analysis by the analytical tool 101, the total number of possible properties of the printed product to be produced is generated. Furthermore, combinations of these properties which are associated with the individual constituents of the printed product are detected. In this way, individual blocks of combinations of input variables 112, which are to be assigned at least to parts of the printed product, are created without it being necessary in this case to go into which pages of the printed product or which sheets of the printed product correspond to two-dimensional combinations of input variables. However, provision can also be simply made for only the total number of all input variables 112 to be determined and stored.

FIG. 2 further shows how the print job information 100 is processed further with the printing originals in the form of PDFs.

For this purpose, the print job information 100 is fed to a job splitter 102 which, on the basis of the rule sets 11 created as described, splits up the print jobs to such an extent that lists are created within the print job information 100 which represent an assignment of the individual components of the printed product to possible combinations of the output variables. These lists can be stored in a common JDF in the form of assignment tables. However, it is also possible to already produce different JDFs at this point. FIG. 2 shows that, in this way, different items of job information 103-106 having corresponding lists L3-L6 are produced, through the use of which the printing originals are assigned to the combination of output variables. These items of job information can be stored in a common JDF or forwarded separately from one another.

The lists obtained in this way are fed to an assignment module 107 which, by using the lists, assigns the printing originals associated with the lists to individual printing systems 108-111. The printing systems 108-111 are in this case determined in such a way that they always correspond precisely to one combination of output variables from the individual lists L3-L6.

Figure 3:
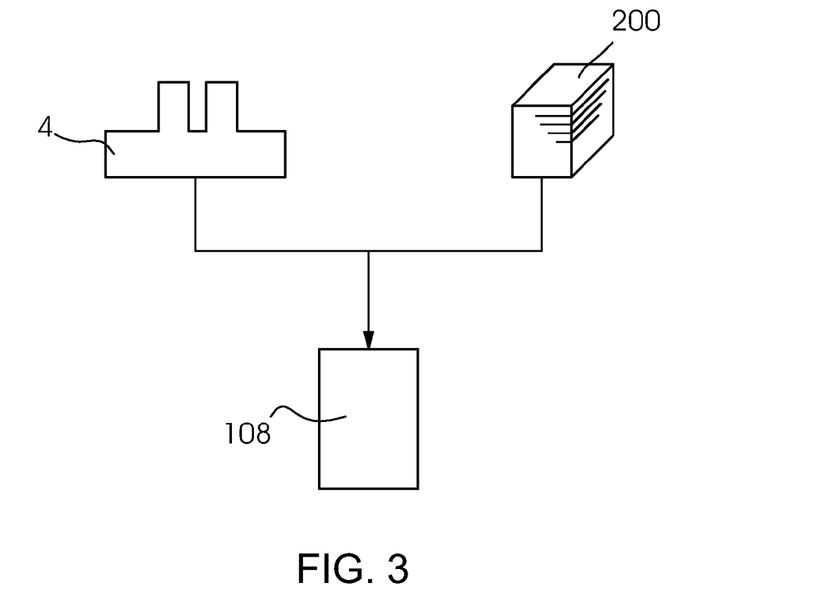
FIG. 3 is a block diagram showing a printing system according to FIG. 2.
Figure 3A:
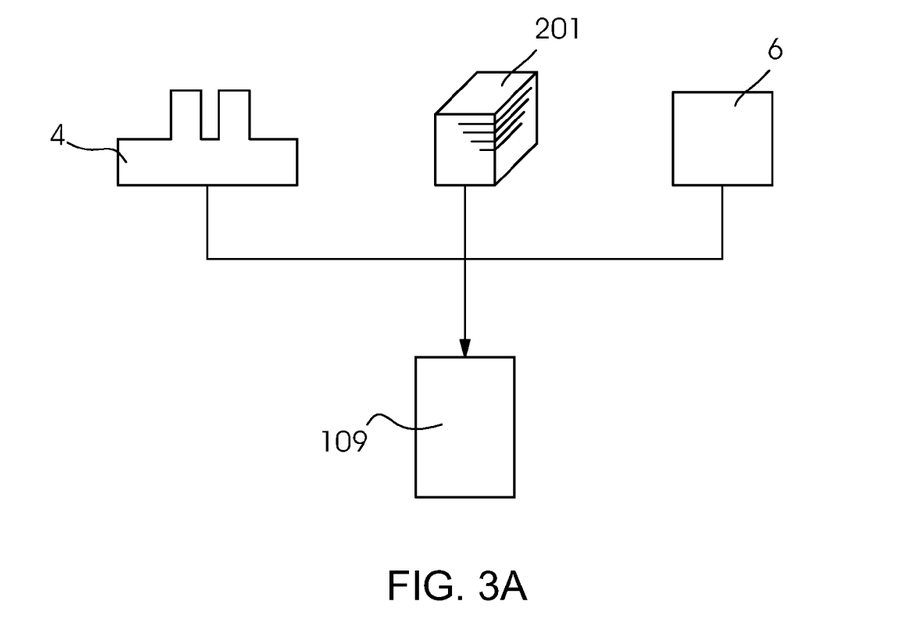
FIG. 3A is a block diagram showing an alternative printing system according to FIG. 2.

Examples of possible printing systems 108-111 are illustrated in FIGS. 3 and 3A.

A printing system 108 according to FIG. 2 is illustrated in FIG. 3. In this connection, a printing system is defined as the group of devices which together create at least part of the printed product. This means that it includes the number of machines which process and further process printing materials for the printed product, and the printing material itself. In the case outlined in FIG. 3, the printing system 108 is illustrated which includes at least a printing press 4 and the printing materials needed for part of the printed product with the type of printing material 200. The printing press 4 can, for example, be a two-color printing press, which prints the type of printing material 200 with one or two colors, depending on a predefinition.

FIG. 3A illustrates a further printing system 109, which includes the printing press 4, a type of printing material 201 and the further processing device 6. Further constituents of a printing system can be all of the devices which provide output variables for the assignment according to that of the assignment module 107.

The type of printing material 201 can, for example, be a printing material which has a higher grammage than the type of printing material 200, and the further processing unit 6 can be a folding apparatus in this case, for example.

As already described, in order to create rule sets 11 in the rule set creation device 9, specific rules R1 to RN can be provided in a rule database 2, to which access can be made through a network 1 or else directly.

Figure 4:
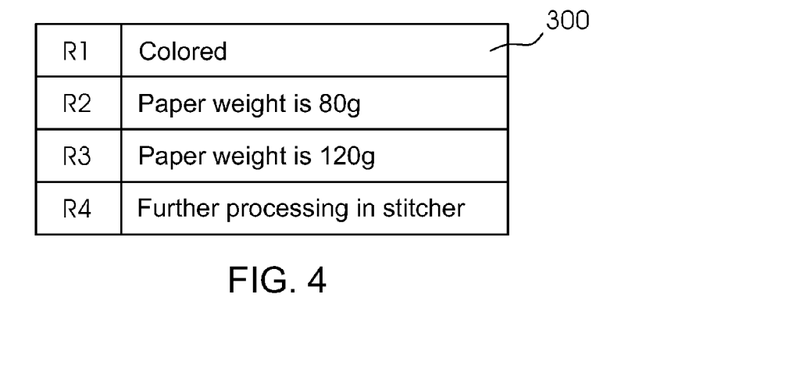
FIG. 4 shows a list of possible rules.

Examples of such rules are illustrated in FIG. 4.

In this case, rule R1 relates to the colored nature of part of the printed product. Through this rule, it is determined whether or not at least part of a sheet, for example, has colored elements. In this way, it is possible to check whether, for example, a page which is to be printed with a sheet is colored or whether all of the pages of a sheet are non-colored. The sheet is thus a reference object, in order to assess the colored nature of which its base objects, the individual pages, are used.

Rule R4 relates to the further processing in a stitcher. Through this rule, parts of the printing material, which means individual sheets, which are to be stitched and which are not to be stitched, can be separated from the sheets.

Rules R2, R3 can be stored in the rule database 2 as a common rule. They relate to the paper weight, which means the grammage of the printing material to be used. In as much as the grammage is a variable property of the printing material which can assume different values, provision can be made for the exact weight to be provided in the rule database 2 as a bookmark and for this bookmark to be filled with the values which result from the input variables of the printed product only in the rule set creation device 9.

In the case illustrated herein, two different types of printing material with different grammages can be provided, with a paper weight of 80 g for rule R2 and with a paper weight of 120 g for R3. Since there are only two alternatives, however, only a single rule R2 or R3 would be sufficient in this case. The rules can be prioritized appropriately for this purpose.

Figure 5:
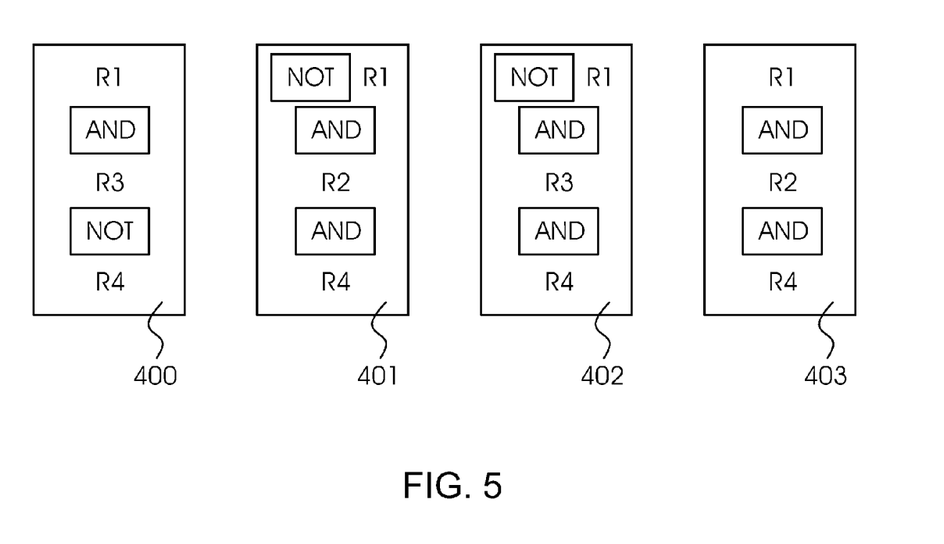
FIG. 5 shows a configuration of possible rule sets.

FIG. 5 illustrates rule sets 400 to 403, which in each case describe parts of a printed product in accordance with the input variables.

Rule set 400 is built up from rules R1, R3 and R4. These rules are combined with one another in accordance with the operators of Boolean algebra. In the cases illustrated herein, only the operators AND and NOT are used. Other Boolean operators, such as OR, can of course also be used.

According to rule set 400, part of the printed product which is to be colored and to have a paper weight of 120 g and not to be stitched, is described.

Rule set 401 describes a further part of the printed product which is not colored, i.e. is black and white, is to have a paper weight of 80 g and is to be provided for further processing in a stitcher.

Rule set 402 describes a part of the printed product which is not colored, is to have a paper weight of 120 g and is to be processed in a stitcher.

Rule set 403 describes a colored component of the printed product which is to have a paper weight of 80 g and is to be provided for further processing in a stitcher.

Figure 6:
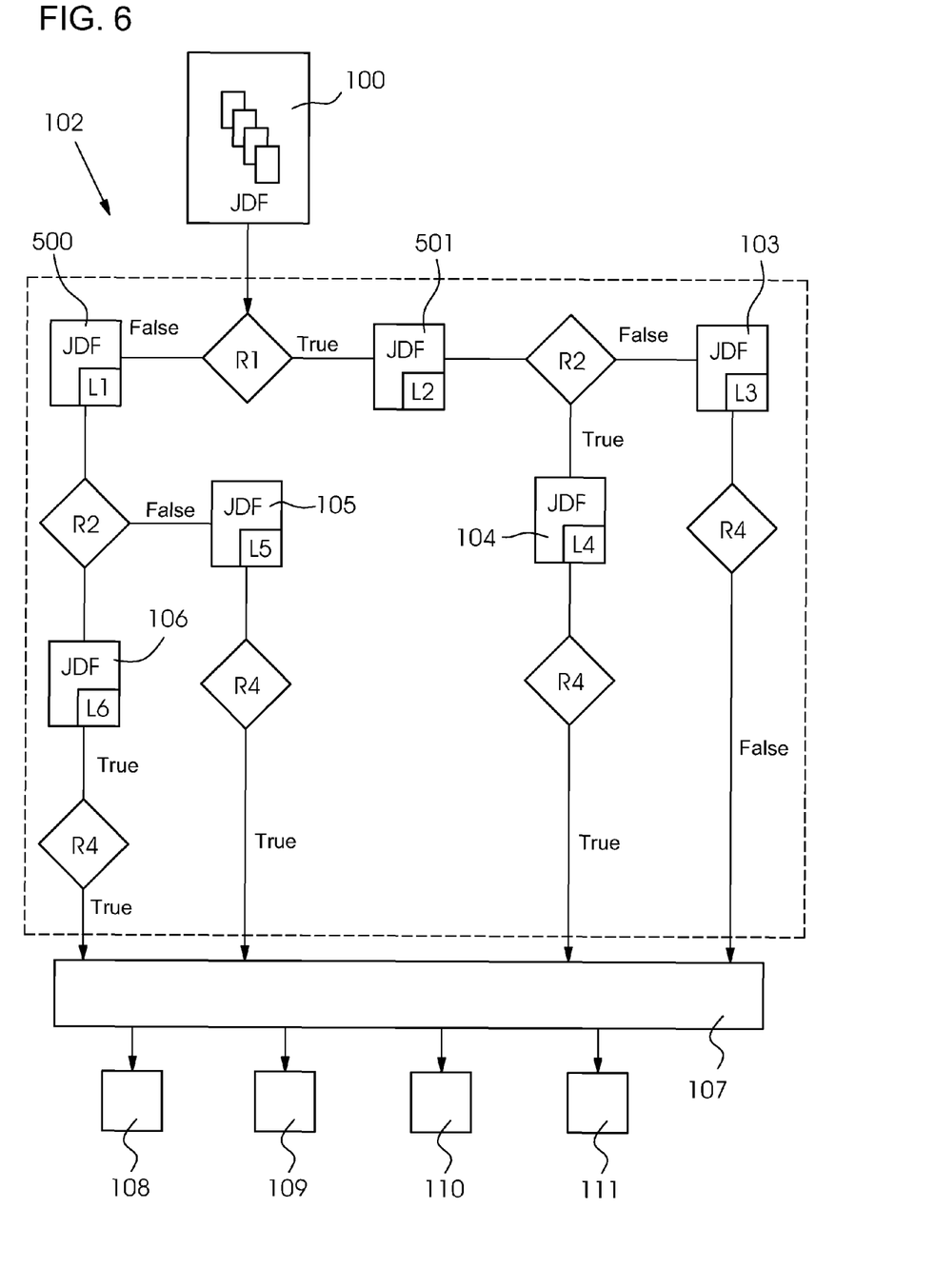
FIG. 6 is a flow chart and block diagram showing splitting of a predefined print object in accordance with a rule set according to FIG. 5 and subsequent assignment to the printing system.

A flowchart of these rule sets for the division of the original print job within the job splitter 102 results in accordance with the flowchart of FIG. 6. Since, for each possible property, such as color, paper weight and further processing, there are always only two alternatives available, Boolean operators, such as OR, are rendered superfluous. The print job 100 is therefore split up in accordance with the rules R1, R2 and R4.

Rules which, according to the logic of the rule sets 400 to 403, would not lead to splitting of the print job 100 or intermediate jobs 500, 501 with lists L1, L2 of constituents of the print job or of constituents of the print job with lists L3 to L4 in accordance with the items of job information 103 to 106, can logically be left out in a further development.

Such rules will always arise when, in accordance with the input variables for a list L1 to L6, following the interrogation of these rules R1 to R4, there is only one of the possibilities that is true or false at all. There would then no longer be any splitting of the list L1 to L6, which means that the list is not split further and thus the list L1 to L6 can itself be accepted, which is to say that the application of the rules R1 to R4 which does not lead to splitting of a list L1 to L6 can also equally be left out in the sequence in the job splitter 102. A corresponding example in this case would be rule R4, as shown in FIG. 6.

As is illustrated in FIG. 6, the print job information 100 is transferred to the job splitter 102. The print job information 100 with the contained list relating to all constituents of the print job is fed to the first rule R1 and, in accordance with the decision of the job splitter 102 about a constituent, such as a sheet of the print job 100, which corresponds to this rule, i.e. is true, or does not correspond to this rule, i.e. is false, the original list of all of the print job constituents is split into two partial lists L1, L2. For this purpose, a corresponding decision apparatus can be provided in the job splitter 102. These partial lists are also stored in the job information or in intermediate jobs 500, 501. Thus, the information as to which constituents of the print job correspond to rule R1 is stored. The intermediate jobs 500, 501 are then in each case further fed to a decision apparatus according to rule R2. In this case, too, the decision is again made as to whether constituents and, if so, which constituents, correspond to the intermediate jobs 501, 500 of rule R2. This then gives rise to corresponding job information 103 to 106 with lists L3 to L6 which contain the information as to which constituents of the print job are assigned in which way to the rules R1, R2. As results unambiguously from the rule sets 400 to 403, the interrogation in accordance with rules R1, R2 is actually sufficient to make a unique assignment to these rule sets 400 to 403 of the constituents of the print job.

The individual items of print job information from the job information 103 to 106 can, however, for clarification, be fed to an additional decision apparatus in accordance with rule R4, wherein, according to the logic of the rule sets 400 to 403, only one result is ever to be expected. Lists L3 to L6 are therefore not split up.

Since, with regard to the paper weight, only the alternatives R2 and R3 exist, actually only one interrogation is sufficient in this case in accordance with one of the two rules R2, R3. For the purpose of completeness, however, rule R3 could also be introduced in addition to rule R2. No splitting is to be expected in this case either. There can always be only one membership of R2 or R3. Thus, in the case of the interrogation of R2, the lists L3 to L6 can automatically be assigned the information that, if rule R2 is satisfied, rule R3 is not satisfied and vice versa. This can also be controlled through the use of an additional interrogation R3.

The job information 103 to 106 with the lists L3 to L6, produced in accordance with the rule sets 400 to 403, is then fed to the assignment module 107, separately or jointly in an item of job information. On the basis of the properties true/false of the individual lists L3 to L6, the lists are assigned to the output variables of the printing systems 108 to 111. On these printing systems 108 to 111, the constituents of the printed product according to the print job 100 can then be produced automatically in accordance with the requirements of the individual constituents.

An example which can be described can, for example, be the production of a printed product in the form of a 32 page brochure with an edition of 200. This brochure is to be saddle-stitched, with the intention being for the cover of the brochure to be depicted in the colors C, M, Y, K, i.e. in color, on heavy paper, such as 120 g. The inner pages are to be printed on 80 g paper. All of the pages are intended to be black/white apart from the central page, which is to have a colored image.

The output variables which are available are an offset printing press for black/white, a digital printing press for color, an apparatus for saddle-stitching and the two printing paper grades at 80 g and 120 g. On the basis of the printing presses which are available and further processing devices and types of printing material, the output variables are specified, with these corresponding substantially to the possible input variables color, black/white, saddle-stitching, heavy paper 120 g, lightweight paper 80 g.

Through the use of a pre-flight tool, the printing information for this print job is analyzed and it is determined how the input variables run. On the basis of these input variables and the output variables made available, a series of rule sets is produced through the use of the rule set creation device 9. The queries which result in this case are the properties color: yes/no
heavy paper 120 g: yes/no and
saddle-stitching: yes/no.

Through the use of these rule sets 400 to 403, the print job is then split into three lists in the job splitter 102:

List 1: color: no; heavy paper: yes; saddle-stitching: yes
List 2: color: no; heavy paper: no; saddle-stitching: yes
List 3: color: yes; heavy paper: no; saddle-stitching: yes In accordance with the predefined output variables of the existing printing systems, the lists 1 to 3 are then fed to the printing systems, including printing press, type of printing material and further processing device, in an assignment module 107.

List 1 is fed to the printing systems including a black/white offset printing press plus heavy printing material plus saddle-stitching device. List 2 is fed to the printing systems including offset printing press plus normal paper plus saddle-stitching, and List 3 is fed to a colored digital printing press plus normal printing material plus saddle-stitching.

If appropriate, the individual printing systems in this case can also be assigned RIPs and plate exposers for the production of the raster bitmap and the printing form for the creation of the final constituent of the printed product.

In accordance with the information from the job information being produced, the constituents of the print job are then created in the printing presses and then fed jointly to the saddle-stitcher and stitched in accordance with the pre-definitions from the job information.

In this way, substantially without any great processing of the print job by an operator, automatic, beneficial assignment of parts of the print job to corresponding printing presses, further processing devices and corresponding types of printing material can be achieved. This information in the JDFs can also concomitantly be provided to the different constituents of the printed product on the way and displayed to a worker through corresponding user interfaces or display devices for the purpose of support.

The invention claimed is:

1. A method for producing a printed product in accordance with a print job, the method comprising the following steps:
   providing the print job with at least one reference object, which itself can include at least one base object;
   providing at least one job file including input variables associated with the base objects and the reference objects and describing desired properties of the reference objects and base objects;
   providing rule sets referring to print jobs having at least two rules stored in a rule set database which is accessible via a network, the rule sets being a function of input variables and output variables of the printed product to be produced;
   assigning the reference objects to lists with the at least two rules;
   assessing, for the assigning step, at least one input variable of the reference objects and the base objects included by the reference objects on the basis of a true/false relationship, with the at least two rules;
   processing the at least two rules successively;
   assessing, with each following rule, the input variables of the reference objects having been assigned to a specific list by the preceding rules;
   assigning the reference objects to further lists in a branching manner, in accordance with the assessing step; and
   assigning each of the last lists branched in accordance with the rule sets of output variables, according to which the printed product is produced.

2. The method according to claim 1, which further comprises newly producing rules on a basis of input variables.

3. The method according to claim 2, which further comprises making a selection of rules available, from which it is possible to build up a rule set assigning the reference objects to lists having desired sets of output variables.

4. The method according to claim 1, which further comprises making a selection of rules available, from which it is possible to build up a rule set assigning the reference objects to lists having desired sets of output variables.

5. The method according to claim 1, which further comprises storing the lists of the associated reference objects in the job file.

6. The method according to claim 1, wherein the reference objects are sheets of printing material or pages on a sheet, and the base objects are pages on the sheet or document parts of the pages on a sheet.

7. The method according to claim 1, which further comprises assembling the rules of the rule sets as a function of the output variables available and/or economic considerations.

8. The method according to claim 7, which further comprises using possible output devices and desired properties of the content of the printed product as output variables.

9. An apparatus for producing a printed product in accordance with a print job for implementing the method according to claim 1, the apparatus comprising:
   a job splitter for splitting at least one list of reference objects in accordance with the rule sets into at least two further branched lists;
   the rule sets referring to print jobs, being stored in a rule set database which is accessible for said job splitter via a network, and including at least two rules assessing base objects included by the reference objects and reference objects in accordance with a true/false relationship and assigning the associated reference objects to appropriate lists, the rule sets being a function of input variables and output variables of the printed product to be produced; and
   the true/false relationships being applied to input variables of the base objects or the reference objects, and the input variables describing the desired properties of the base objects and reference objects.

10. The apparatus according to claim 9, which further comprises an assignment module for assigning lists of reference objects to output variables on a basis of the input variables of base objects or reference objects to which all reference objects of a list correspond.

* * * * *